United States Patent
Srinivasan et al.

(10) Patent No.: US 10,999,212 B2
(45) Date of Patent: May 4, 2021

(54) MACHINE-LEARNING-BASED AGGREGATION OF ACTIVATION PRESCRIPTIONS FOR SCALABLE COMPUTING RESOURCE SCHEDULING

(71) Applicant: Accenture Global Solutions Limited, Dublin (IE)

(72) Inventors: Madhan Kumar Srinivasan, Bangalore (IN); Arun Purushothaman, Chennai (IN); Manish Sharma Kolachalam, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 16/423,720

(22) Filed: May 28, 2019

(65) Prior Publication Data

US 2020/0382437 A1  Dec. 3, 2020

(51) Int. Cl.
| | | |
|---|---|---|
| *H04L 12/911* | (2013.01) | |
| *G06N 5/04* | (2006.01) | |
| *H04L 12/24* | (2006.01) | |
| *G06N 20/00* | (2019.01) | |

(52) U.S. Cl.
CPC .............. *H04L 47/70* (2013.01); *G06N 5/04* (2013.01); *H04L 41/16* (2013.01); *G06N 20/00* (2019.01)

(58) Field of Classification Search
None
See application file for complete search history.

(56) References Cited

U.S. PATENT DOCUMENTS

| 7,167,483 B1* | 1/2007 | Sharma | ..................... H04J 3/14 370/442 |
|---|---|---|---|
| 10,152,349 B1* | 12/2018 | Anand | ................... G06N 5/003 |
| 2009/0175324 A1* | 7/2009 | Sampath | ............... H04L 5/0007 375/222 |

(Continued)

FOREIGN PATENT DOCUMENTS

EP    3454210 A1    3/2019

OTHER PUBLICATIONS

U.S. Appl. No. 16/154,174, filed Oct. 8, 2018.

(Continued)

*Primary Examiner* — Scott B Christensen
(74) *Attorney, Agent, or Firm* — Brinks Gilson & Lione

(57) ABSTRACT

A multi-layer resource aggregation (RA) stack may generate prescriptive activation timetables for controlling activation states for computing resources. To facilitate operator control and adjustment, the RA stack may, at an aggregation engine layer, aggregate the computing resource into one or more resource aggregates. The computing resources within the resource aggregates may have similar individual activation prescription patterns. Machine learning techniques may be used by the RA stack to identify these related individual activation prescription patterns and aggregate the computing resources accordingly. Once aggregated, the RA stack may make a uniform activation determination for the aggregates as single units. Therefore, the computing resources within the aggregate may be controlled and/or adjust together. Thus, the RA stack increases the scalability of implementation of prescriptive computing resource activation state determinations.

20 Claims, 6 Drawing Sheets

(56) References Cited

U.S. PATENT DOCUMENTS

| | | | |
|---|---|---|---|
| 2016/0092774 A1* | 3/2016 | Wang | G06N 5/04 |
| | | | 706/12 |
| 2018/0011920 A1* | 1/2018 | Simske | G06F 16/35 |
| 2018/0330275 A1* | 11/2018 | Jain | G06N 20/00 |
| 2019/0079848 A1 | 3/2019 | Srinivasan et al. | |
| 2019/0179675 A1 | 6/2019 | Srinivasan et al. | |
| 2019/0205150 A1 | 7/2019 | Srinivasan et al. | |

OTHER PUBLICATIONS

U.S. Appl. No. 16/219,435, filed Dec. 13, 2018.
U.S. Appl. No. 16/285,539, filed Feb. 26, 2019.
U.S. Appl. No. 16/411,064, filed May 13, 2019.
Extended Search Report of European application 20176733.2, dated Nov. 2, 2020, 14 pages.

* cited by examiner

MACHINE-LEARNING-BASED AGGREGATION OF ACTIVATION PRESCRIPTIONS FOR SCALABLE COMPUTING RESOURCE SCHEDULING

TECHNICAL FIELD

This disclosure relates to aggregation of activation prescriptions for computing resource scheduling.

BACKGROUND

Rapid advances in communications and storage technologies, driven by immense customer demand, have resulted in widespread adoption of cloud systems for managing large data payloads, distributed computing, and record systems. As one example, modern enterprise systems maintain data records many petabytes in size. Improvements in tools for cloud resource allocation and consumption prediction will further enhance the capabilities of cloud computing systems.

DETAILED DESCRIPTION

Figure 1:
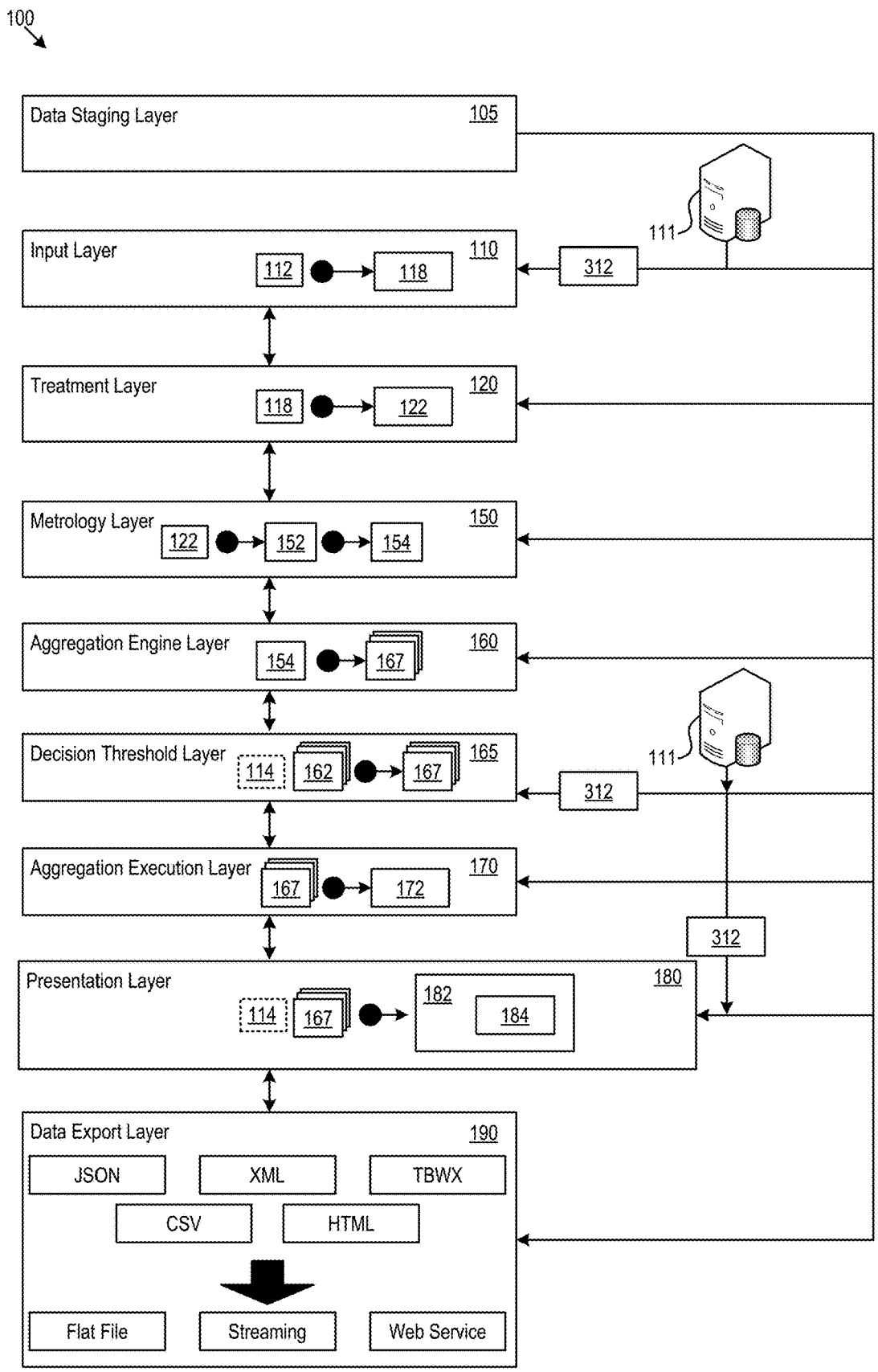
FIG. 1 shows an example multiple layer resource aggregation stack.

In various cloud computing systems, computing resources such as virtual machines, memory, processor cores, or other computing resources may be scheduled for planned utilization. In some cases, a computing resource scheduled for planned utilization may remain unutilized due to an unpredicted lack of demand. Further, in some cases, an unduly large set of computing resources may be scheduled because of uncertainty in computing resource demand. As a result, in many cases, excess computing resources may be scheduled leading to inefficient utilization of resources. In other cases, uncertainty may lead to insufficient scheduling of resources, which in turn, may lead to over utilization of scheduled resources, performance degradation, and/or service interruption.

Accordingly, increased scheduling accuracy provides a technical solution to the technical problem of system inefficiency by increasing the utilization of cloud computing resources. The resource aggregation (RA) stack techniques and architectures described below may be used to accurately prescribe future cloud activation recommendations based on data patterns at different timescales including one or more era timescales, e.g. minute timescales, hourly timescales, daily timescales, weekly timescales, monthly timescales, seasonal timescales, annual timescales, time-invariant contributions, or other timescales. Further, data analysis may include data sources such as, utilization data, or other metadata. Thus, the RA stack may provide prescriptive analytical resource scheduling taking into account resource utilization patterns present on multiple timescales. Further, the RA stack may work in concert with other prescriptive stacks that may rely on additional or alterative data sources. As one example, the activation timetable stack described in U.S. patent application Ser. No. 15/811,339, filed Nov. 13, 2017, titled Prescriptive Analytics Based Activation Timetable Stack for Cloud Computing Resource Scheduling, which is incorporated by reference in its entirety. Therein, the activation timetable stack accurately prescribe future cloud activation recommendations for individual cloud resources and/or defined functionally groups based on data patterns at different timescales including one or more era timescales, e.g. minute timescales, hourly timescales, daily timescales, weekly timescales, monthly timescales, seasonal timescales, annual timescales, time-invariant contributions, or other timescales using data sources including expenditure report data for resource reservation/activation, computing resource consumption metric data, activation request data, functional grouping data, topological or relationship data, tagging data, or other metadata.

In some cases, the number of individual computing resources managed by the system may provide challenges regarding the scalability of technical management. For example, the number of decisions for individual computing resources that may be reviewed to sustain operation of a datacenter or multiple co-managed datacenters may reduce the efficiency of the prescriptive system. Further, the availability and/or translatability of existing or new operator-defined functional groupings may be limited. The RA stack may further analyze the utilization data to aggregate the computing resources into resource aggregates with related utilization patterns. The management of the resource aggregates may, in some cases, be scalable in view of the numbers of individual computing resources involved in (e.g., cloud-based) datacenter/multiple data center operation. For example, using the scalable solution of the RA stack, an operator may be able adapt prescriptive activation determinations to dynamically changing resource utilization schedules. For example, the operator may be able to more frequently update prescriptive activation determinations with fewer review decisions than would be compelled without resource aggregates. Accordingly, the discussed RA stack techniques and architectures provide an improvement to the underlying hardware by increasing the efficiency and accuracy of prescriptive determination, prescriptive determination review, and prescriptive determination implementation. Accordingly, the discussed RA stack techniques and architectures also provide an improvement over existing market based solutions based on the technical adaptability to a broader variety of cloud-based computing resource use cases of the resource aggregate utilizing system relative to other existing solutions.

FIG. 1 shows an example multiple layer RA stack 100. In this example, the RA stack 100 includes a data staging layer 105, an input layer 110, a treatment layer 120, a metrology layer 150, an aggregation engine layer 160, a decision threshold layer 165, an activation execution layer 170, a presentation layer 180 and a data export layer 190. The RA stack 100 may include a multiple-layer computing structure of hardware and/or software that may provide prescriptive analytical recommendations (e.g., power scheduling for virtual machines or other computing resource activation scheduling, prescriptive resource aggregations, and/or other prescriptive recommendations) through data analysis.

In some implementations, as discussed below, HyCloud-Sched™—a Hyper Intelligent Multi-Scenario Decision Threshold Clustering Approach for Cloud Scheduler Systems™ developed by Accenture® Bangalore may be operated as the RA stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the RA stack 100, the data staging layer 105 may provide the input layer 110 with storage resources to store interval-scaled data within a database. Hence, the data staging layer 105 may provide a hardware resource, e.g., memory storage resources, to the input layer 110.

Figure 2:
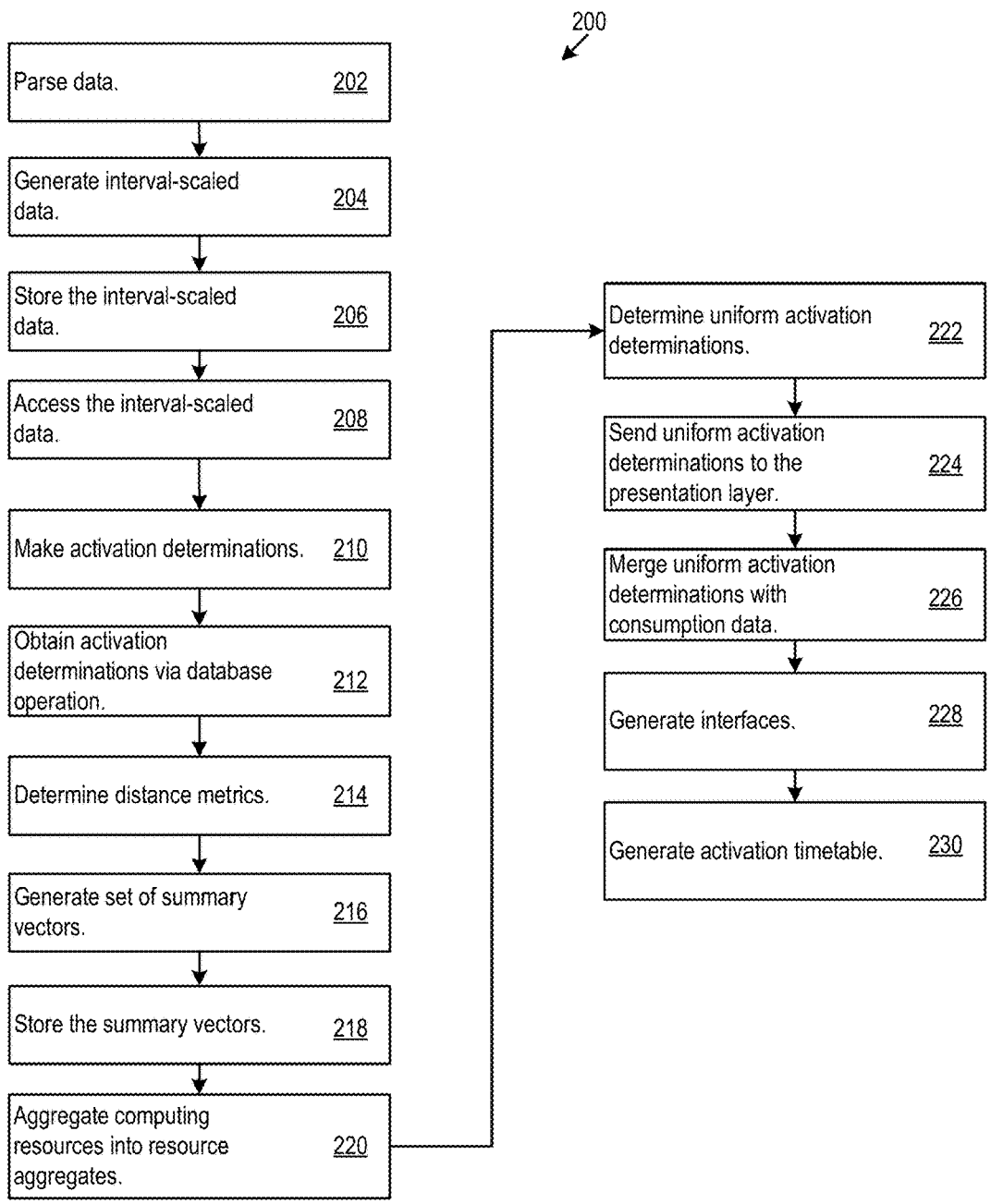
FIG. 2 shows example resource aggregation stack logic.

In the following, reference is made to FIG. 1 and the corresponding example RA stack logic (RASL) 200 in FIG. 2. The logical features of RASL 200 may be implemented in various orders and combinations. For example, in a first implementation, one or more features may be omitted or reordered with respect to a second implementation. At the input layer 110 of the RA stack 100, the RASL 200 may parse historical utilization data 112 (202) to generate interval-scaled data 118 for a selected interval (204). In some cases, the historical utilization data 112 may be received via communication interfaces (e.g., communication interfaces 312, discussed below). The historical utilization data 112 may be accessed at least in part, e.g., via the communication interfaces 312, from data sources 111, which may include, cloud compute utilization databases, cloud expenditure databases, committed-use history databases, or other data sources. The selected interval may be selected based on scheduling patterns within the data, operator directed selections, default selections, or other selection schemes. In some cases, the interval-scaled data may be handled as if cycling, at least in part, in accord with the interval. Further, the interval may be divided into one or more timeslots. In some cases, for each computing resource an activation determination may be made for the timeslots (in some cases, each timeslot) within the interval. The timeslots may repeat for the next interval. In some cases, the timeslots may dynamically adjust from interval-to-interval. In some case, the interval itself may be aperiodic, for example, a non-holiday interval may follow a holiday interval of different duration. In some cases, periodic intervals may be selected such as daily, weekly, monthly, quarterly, yearly, or other periodic interval. A timeslot may include another duration that may be shorter than the interval over which activation determinations may be made (such as per minute, hourly, daily, or other duration). In some cases, the duration of the timeslots may be determined based on the resolution for activation/deactivation by cloud computing service providers hosting the computing resources.

Once the interval-scaled data is generated, the input layer 110 may store, via a database operation at the data staging layer 105, the interval-scaled data 118 (206). For example, the interval-scaled data 118 may be stored on storage dedicated to the RASL 200. Additionally or alternatively, the interval-scaled data 118 may be stored on a shared database or cloud storage. Accordingly, the data staging layer 105 may further access network resources (e.g., via communication interfaces 312, discussed below) to implement memory resource provision to the other layers. In an example implementation, the RASL 200 may be defined within a Revolution-R environment. However, other design platforms may be used.

The treatment layer 120 may access the interval-scaled data 118 using a memory resource provided by the data staging layer 105 (208). For example, the data staging layer 105 may provide a memory read resource (such as a SQL database read resource) to the treatment layer 120 to allow access to the interval-scaled data 118.

Based on the interval-scaled data 118, activation determinations 122 may be made for the timeslots for the individual computing resources (210). The activation determinations 122 may be made by the RA stack, e.g., at the treatment layer 120 (in some cases augmented with prescriptive engine logic such as the processing and logical tool used in the prescriptive engine layer of the activation timetable stack discussed in U.S. patent application Ser. No. 15/811,339, previously incorporated by reference). Additionally or alternatively, a separate (e.g., logically or physically separated) activation timetable stack may generate activation determinations 122 for the timeslots.

In an illustrative scenario, the treatment layer 120 may apply the example algorithm in Table 1, below to determine the activation determination for a given timeslot for a given computer resource. The example algorithm recommends deactivation of computing resources with peak values below an "OFF Threshold" (e.g., an activation threshold) and for those computing resources for which P values for a selected percentile are below the OFF Threshold.

TABLE 1

| | Example Activation Determination Algorithm |
|---|---|
| | Description |
| Example Algorithm | IF Peak Utilization (Timeslot) < OFF threshold OR IF Peak Utilization (Timeslot) > OFF threshold AND P < OFF threshold THEN OFF ELSE ON |

Peak values may include values greater than other values within a defined group such as a maximum determined value, a greatest value in a range or selected group of values, or other value greater than at least some others in a defined group.

After generation of the activation determinations 122, the metrology layer 150 may obtain the activation determinations 122, e.g., via operation at the data staging layer 105 (212).

At the metrology layer, the RASL 200 may compare the activation determinations 122 to determine distance metrics (214). The distance metrics 152 may include determination of relevant distance scales based on differences among activation determinations for the computing resources. For example, the RASL 200 may determine distance scales within the space that establish whether activation determinations are "close" within the space or "far" within the space by representing the differences as distances within a space (e.g., more overlapping activation determinations indicate a "closer" relationship, while fewer overlapping activation determinations indicate a "farther" relationship). The distance metrics 152 may ensure that the distance scales are applied for the actual spacings of the activation determinations 122. For example, determinations for two computing resources that would be "close" (and e.g., more likely to be aggregated into the same resource aggregate at the aggregation engine layer 160 as discussed below) for a first group of computing resources may be "far" for another more tightly spaced set of computing resources with, e.g., a less distant median spacing.

In some cases, the computing resources may be analyzed using a machine learning classification technique. For example, support vector machines, decision trees, boosted trees, supervised and unsupervised random forests, neural networks, and/or nearest neighbor classification techniques may be used.

In an illustrative example, unsupervised random forest classification algorithms may be used. For the unsupervised random forest classification algorithm, the RASL 200 may use decision trees to position the computing resources within a space based on their respective activation determinations. Once classified, the RASL 200 may determine the distance metrics 152 based on distances (e.g., spacings) between computing resources determined via the unsupervised random forest classification algorithm to generate the summary vectors 154 discussed below. The positions may be calculated using any of various internal metrics, e.g., such that computing resources with more overlap activation determinations are (at least in most cases) placed closer together than those with less overlap.

After obtaining distance metrics 152, the metrology layer 150 may compile a set of summary vectors 154 (216). The summary vectors 154 may, for the individual computing resources, provide a matrix (or other data structure) detailing the inter-computing-resource distance for the other computer resources that are analyzed. For example, the summary vectors 154 may include n-dimensional vectors where the entries within the vectors represent the distance between the resource to which the vector is assigned and another computing resource within the analysis. Thus, the n may be equal to N−1, where N is the number of computing resources being analyzed.

The set of summary vectors 154 may be stored, via a database operation at the data staging layer 105 (218).

After the summary vectors 154 are determined at the metrology layer, the RASL 200 may pass the distance metrics 152 and summary vectors 154 to the aggregation engine layer 160 e.g., via memory operation at the data staging layer 105.

At the aggregation engine layer 160, the RASL 200 may aggregate the multiple computing resources into a selected number of resource aggregates (220). The selected number of resource aggregates may be less than the total number of computing resources. Thus, at least one of the resource aggregates may have more than one computing resource aggregated within it. In some cases, the average occupancy of a resource aggregate for a particular system may exceed two. In some cases, the selected number of resource aggregates may be determined based on a target average occupancy for an aggregate.

In some cases, the selected number may be based on operator preferences, consumption efficiency targets, overall target aggregate number, or other preferences.

In some cases, the aggregation engine layer 160 may aggregate the multiple computing resources into the selected number of resource aggregates 162 based on machine learning clustering techniques. For example, K-means clustering, mean-shift clustering, density-based spatial clustering, expectation maximization clustering, agglomerative hierarchical clustering, or other clustering techniques may be implemented.

In an illustrative example, the RASL 200 may aggregate the multiple computing resources into the selected number of resource aggregates 162 using K-means clustering. In the example, the computing resources may be aggregated into the aggregates that produce a base value for a least-squares distance analysis. In some cases, the distance metrics 152 determined at the metrology layer may be used to provide a seed aggregate configuration to the K-means clustering algorithm. In some cases, the distance metrics 152 may be used to provide an initial grouping threshold for the K-means algorithm that may be iteratively improved during execution of the K-means clustering algorithm.

In some cases, a base value, such as a base least squares distance or other base value, may be a value that is lower than other values in a defined group such as a minimum determined value, a lowest value in a range or selected group of values, or other value lower than at least some others in a defined group.

In some cases, the RASL 200, may determine resource aggregates 162 for multiple selected numbers. For example, to provide an operator with selections of different consumption efficiency and implementation efficiency options, the RASL 200 may vary the selected number such that the average resource aggregate occupancy may vary. For example, resource aggregates with average occupancies of 1, 3, and 5 computing resources may be calculated. For each of the determined resource aggregate configurations, uniform activation determinations 167 may be determined.

Once the resource aggregates are determined, the RASL 200, at the decision threshold layer 165, may determine uniform activation determinations 167 for the resource aggregates (e.g., for each of the resource aggregates) (222). In some cases, the uniform activation determination may be based on the membership of an individual aggregate and the individual activation determinations for the computing resources for a given timeslot. In some cases, the uniform activation determinations 167 may be based on a predetermined activation threshold. The predetermined activation threshold may define an integer number of computing resources that may have an active activation determination. If the number of active activation determinations for the timeslot exceeds the pre-determined activation threshold, the uniform activation determination may be "active." If the activation determinations for the timeslot is less than the pre-determined activation threshold, the uniform activation determination may be "inactive." Accordingly, if the uniform activation determination is "active," each of the computing resources within the resource aggregate may be marked active for the timeslot. Accordingly, if the uniform activation determination is "inactive," each of the computing resources within the resource aggregate may be marked for deactivation for the timeslot.

Figure 6:
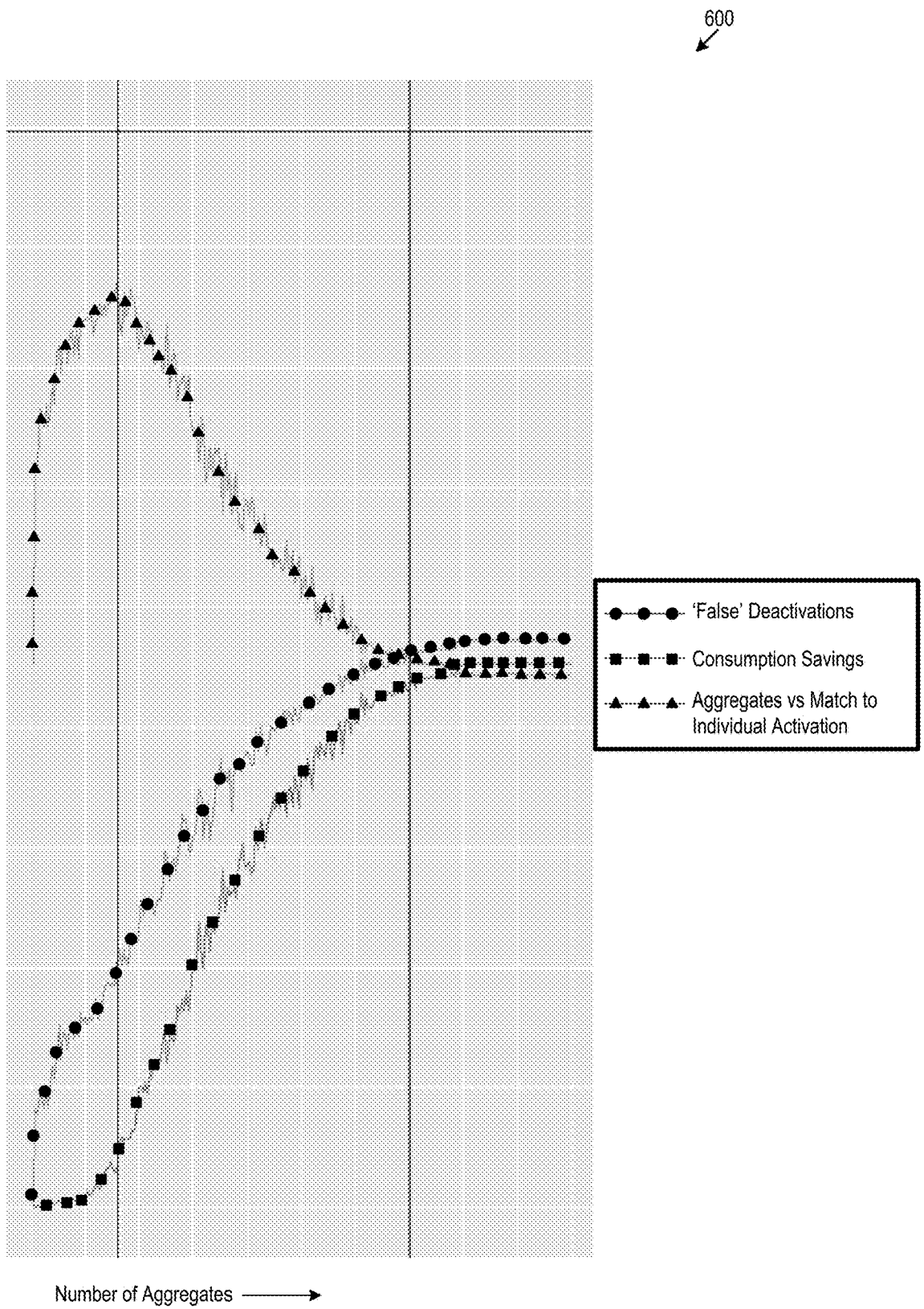
FIG. 6 shows an example plot of 'false' deactivations versus the match to individual determinations versus consumption savings for a set activation threshold.

In some cases, the activation threshold (or the target number of aggregates when the activation threshold is pre-determined) may be determined by the RASL 200 at the decision threshold layer 165 based on aggregate average occupancy and the number of computing resources that may be deactivated in various timeslots. In some cases, consumption data 114 (discussed below) may be accessed at the decision threshold layer 165 to determine consumption savings for different activation threshold selections. The decision threshold layer 165 may compare plots of 'false' deactivations (as discussed below) versus the match to individual determinations versus consumption savings for a set activation threshold to select an activation threshold for a selected number of aggregates for a given set of multiple computing resources. FIG. 6 shows an example plot 600 of 'false' deactivations versus the match to individual determinations versus consumption savings for a set activation threshold. Accordingly, an activation threshold (or target number of aggregates) may be selected by the RASL 200 at the decision threshold layer 165 based on the behavior of the curves.

Once the uniform activation determinations are made, the RASL 200 may send the uniform activation determinations 167 to the presentation layer 180 (e.g., via memory operation at the data staging layer 105) (224). At the presentation layer 180, the RASL 200 may access consumption metric data 114. The consumption metric data 114 may be provided by cloud expenditure databases, master virtual machine cost databases, virtual machine family/template description data, or other resource consumption data sources. In some cases, the consumption metric data 114 may be accessed via the communication interfaces 312 and via data sources 111.

The RASL 200 may, at the presentation layer 180, merge the consumption metric data 114 with the uniform activation determinations to determine consumption savings (226). The presentation layer 180 may generate RA-control interfaces 182 and RA-window presentations 184 (as discussed below) to facilitate operator review of the uniform activation determinations (228). In some cases, the RA-control interfaces 182 and RA-window presentations 184 may further reflect to consumption metric data 114 and consumption savings to allow operator review in view of such additional information. The RA-control interfaces 182 and RA-window presentations 184 may include graphical representations of the uniform activation determinations and cause a user interface (e.g., user interface 318, a remote user interface on a network-connected device, or other user interface) to display the graphical representations.

Following operator review, adjustment and approval of the uniform activation determinations (or, in some implementations, directly upon the generation uniform activation determinations without operator intervention and/or review) the RASL 200 may generate, at the activation execution layer 170 an activation timetable 172 that may be sent to a host interface for control of the scheduling of the computing resources (e.g., activation/deactivation for the timeslots). The activation timetable 172 may specify the activation states for computing resources for the timeslots within a given period. In some cases, the activation timetable 172 may specify activation states for individual computing resources. Further, the activation states within the activation timetable may be specified for timeslots.

After generation of the activation timetable, the RASL 200 may initiate deployment of the activation timetable by causing the network interface circuitry to send the activation timetable to a host interface for control of the computing resources (230). For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the computing resources. The RASL 200 may also use a scheduling proxy system that uses the activation timetable 172 data to maintain schedules, calling the service provider's application programming interfaces for each activation control action defined by the activation timetable data source. Accordingly, a client may use the host interface to reserve/activate computing resources. In some cases, reservations/activations may lead to expenditures accruing against the client. Accordingly, consumption savings may be increased by specifying reservations to the base timing granularity (e.g., minimum granularity) supported by the host interface. In some cases, when the system granularity is the same or less than the granularity supported by the host interface, the activation timetable may be provided to the host interface with detail at the granularity of the host interface. In some cases, where the system granularity is greater than the granularity supported by the host interface, the activation timetable may be interpolated to allow for activation state specification at the granularity supported by the host interface.

In some cases, the RASL 200 may initiate deployment via the data export layer 190. The data export layer 190 may format the activation timetable in one or more formats for transfer. For example the data export layer 190 may support format translation to java script object notation (JSON), eXtensible markup language (XML), comma separated value CSV, Tableau Workbook (TBWX), hyper-text markup language (HTML) or other formats. The data export layer 190 may also support transfer of the activation timetable in one or more states, such as flat file transfers, streaming transfers, web service access, internet protocol transfers, or other transfers.

Additionally or alternatively, the RASL 200 may initiate deployment via the activation execution layer 170 through direct transfer, direct network access, or other non-export transfer.

Figure 3:
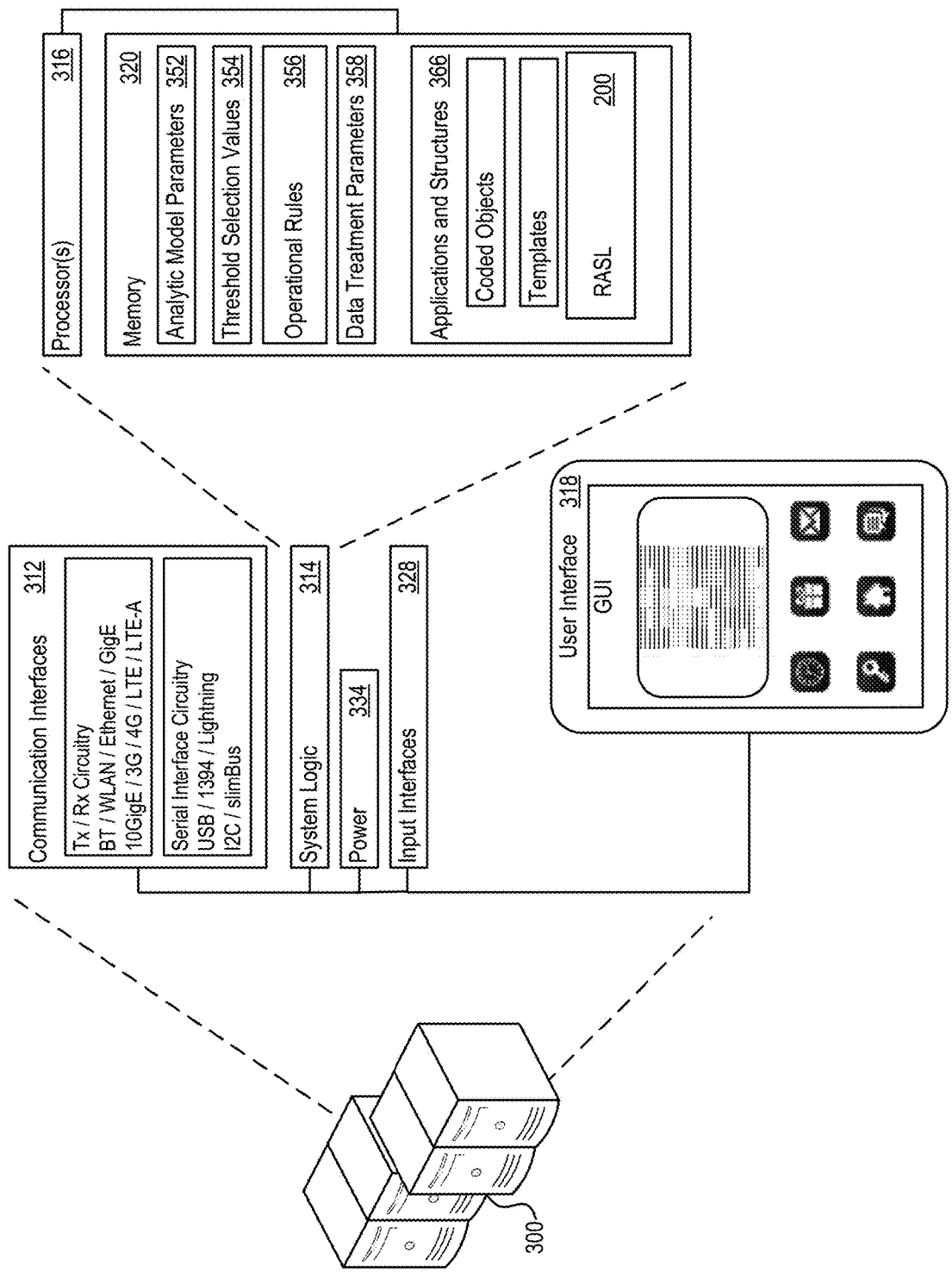
FIG. 3 shows an example specific execution environment for the resource aggregation stack of FIG. 1.

FIG. 3 shows an example specific execution environment 300 for the RA stack 100 described above. The execution environment 300 may include system logic 314 to support execution of the multiple layers of RA stack 100 described above. The system logic may include processors 316, memory 320, and/or other circuitry.

The memory 320 may include analytic model parameters 352, threshold selection values 354, operational rules 356, and data treatment parameters 358. The memory 320 may further include applications and structures 366, for example, coded objects, machine instructions, templates, or other structures to support forward utilization data generation, activation state flagging, era variable identification or other tasks described above. The applications and structures may implement the RASL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I²C, slimBus, or other serial interfaces. The execution environment 300 may include power functions 334 and various input interfaces 328. The execution environment may also include a user interface 318 that may include human-to-machine interface devices and/or graphical user interfaces (GUI). In various implementations, the system logic 314 may be distributed over multiple physical servers and/or be implemented as a virtual machine.

In some cases the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the RA stack 100, of the execution environment onto the hardware resources. In some cases, a manifest may be stored as a preference file such as a YAML (yet another mark-up language), JSON, or other preference file type.

Figure 4:
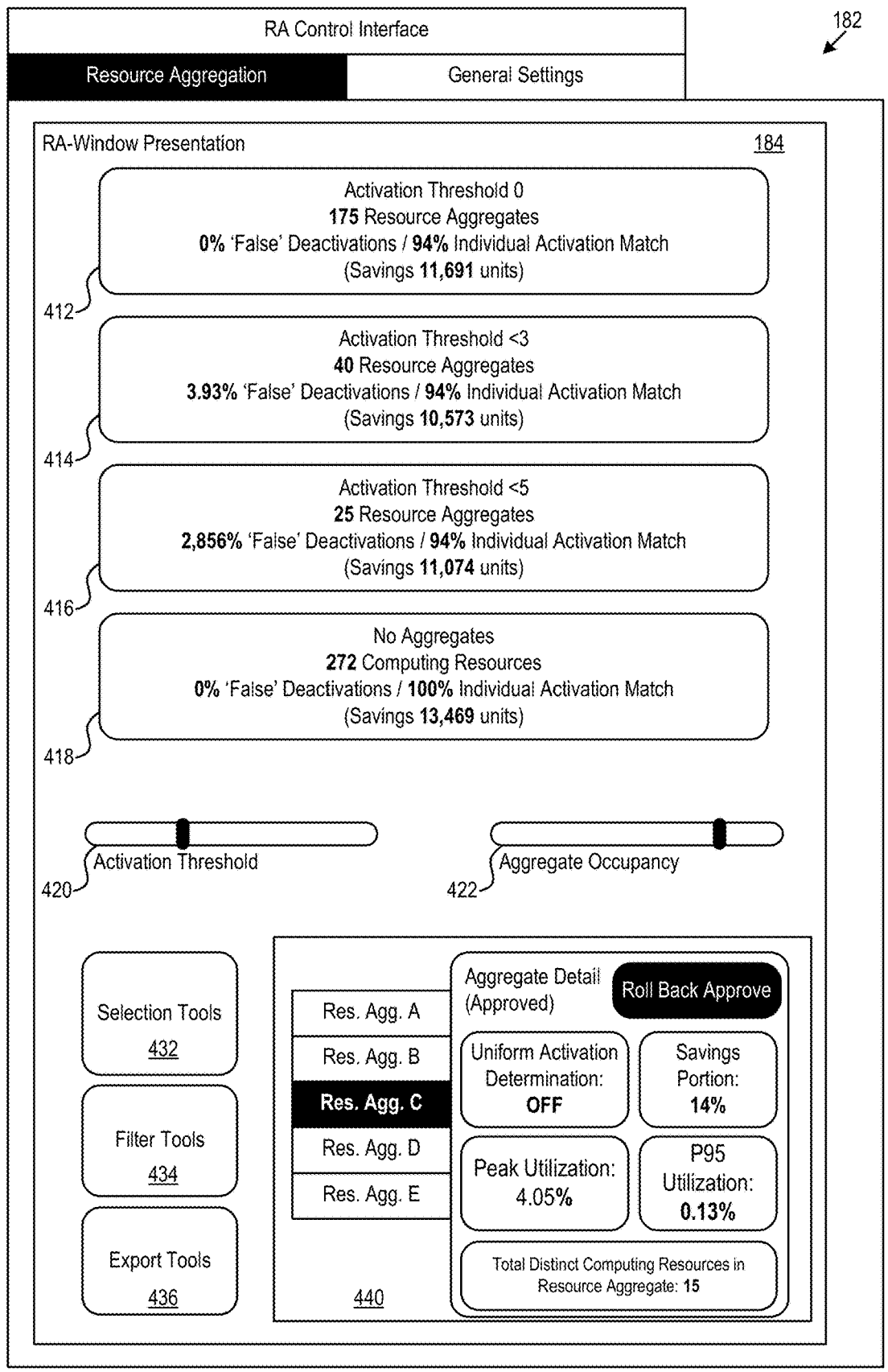
FIG. 4 shows an example resource aggregation control interface 182 is shown

Referring now to FIG. 4, an example RA control interface 182 is shown. The RA control interface 182 includes an example RA-window presentation 184 as discussed above. The RA-window presentation 184 may include multiple selectable options 412, 414, 416, 418, 420, 422 and data regarding the uniform activation determinations for different target numbers of aggregates (e.g., different average occupancies) and different activation thresholds. In this example scenario, the selectable options may include a 412, 414, and 416 with different target numbers of aggregates and different activation thresholds, option 418 may provide an option to apply individual activation determinations without aggregates. Options 420, 422 may provide inputs to adjust preferences (e.g., activation thresholds, aggregate occupancy, or other criteria) and re-run the RASL 200 at the relevant layers (depending on the option changed), or other selectable options to control the eventual activation timetable output.

Additionally or alternatively, the RA-window presentation 184 may include selection and filter tools 432, 434 to support granular manipulation of the activations, e.g., by computing resource, by resource aggregate, resource region, operating system, or other granular manipulation. The RA-window presentation 184 may also include export tools 436 for management of data export layer 190 operations.

In some implementations, the RA-window presentation 184 may include a resource aggregate detail panel 440 for management of aggregate-level selectable options such as aggregate-level approvals of uniform activation determinations. Additionally or alternatively, the resource aggregate detail panel 440 may display aggregate-level information regarding activations. Resource aggregate detail panel 440 may also provide an option to roll back previously approved activations.

In the example, shown in FIG. 4, the options 412, 414, 416 allow for selection among different numbers of aggregates and different threshold selections. Different consumption levels may be achieved using the different options. Further, in some cases different levels of 'false' deactivations may be achieved. Uniform activation determinations may, in some cases, result in a computing resource that would individually be activated for a given timeslot to being deactivated. This may be referred to as a 'false' deactivation. In some cases, such 'false' deactivations may affect performance of a computing resource system. Accordingly, the operator may select parameters to determine a desired consumption savings and tolerable level of 'false' deactivations (including, in some cases, no 'false' deactivations).

Figure 5:
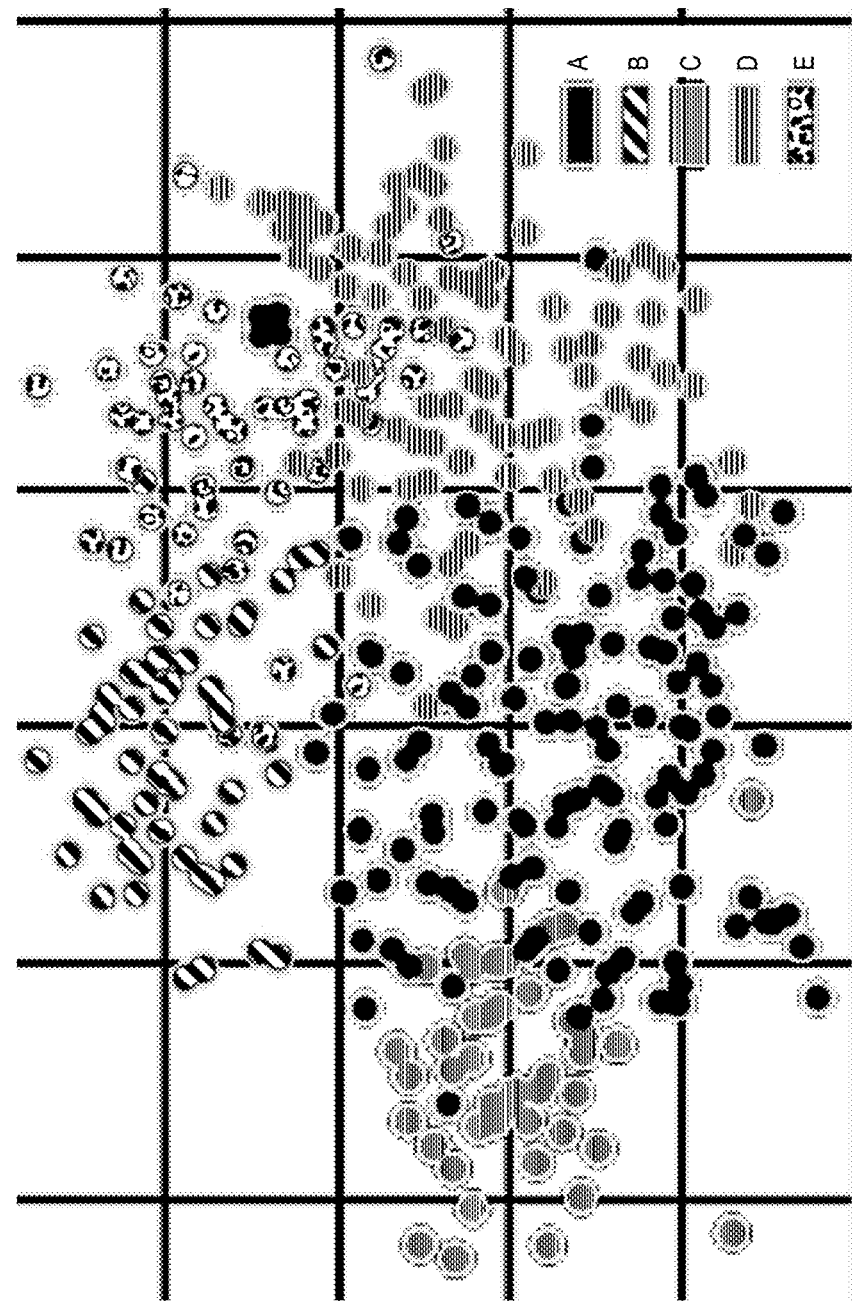
FIG. 5 shows example aggregate determination performance for an example set of computing resources managed by an example implementation of the resource aggregation stack logic of FIG. 2.

FIG. 5 shows example aggregate determination performance 500 for an example set of computing resources managed by an example implementation of the RASL 200. The example resources are divided into five aggregates after having outlier resources (e.g., on for all timeslots, off for all timeslots, or other outliers) removed from the analysis set. The determined aggregates display grouping correlated with spatial proximity. As these results demonstrate, the computing resource aggregation techniques and architectures described above facilitate accurate association of computing resources.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: network interface circuitry configured to: receive historical utilization data for multiple computing resources; and receive activation schedule data for the multiple computing resources; and aggregation circuitry in data communication with the network interface circuitry, the aggregation circuitry configured to execute a resource aggregation (RA) stack, the RA stack including: a data staging layer; an input layer; a treatment layer; a metrology layer; an aggregation engine layer; a decision threshold layer; and an activation execution layer; and the RA stack executable to: parse, at the input layer, the historical utilization data to generate interval-scaled data for a selected interval; store, via a memory operation at the data staging layer, the interval-scaled data; access, at the treatment layer, the interval-scaled data using a memory resource provided by the data staging layer; generate, for each of the multiple computing resources, a set of activation determinations corresponding to multiple timeslots with a selected duration including the selected interval; store, via a memory operation at the data staging layer, the set of activation determinations for each of the multiple computing resources; access, at a metrology layer of the RA stack, the set of activation determinations using a memory resource provided by the data staging layer; at the metrology layer, generate distance metrics by comparing the sets of activation determinations to determine spacings among individual ones of the multiple computing resources; based on the distance metrics, determine a set of summary vectors detailing the spacings among the individual ones of the multiple computing resources; pass, to an aggregation engine layer of the RA stack via memory operation at the data staging layer, the distance metrics and the summary vectors; based on the distance metrics and the summary vectors, aggregate the multiple computing resources in to a selected number of resource aggregates, the selected number being less than a total number of the multiple computing resources; and for each of the resource aggregates: determine, at the decision threshold layer, a uniform activation determination for a corresponding future timeslot of the selected duration; and generate, at the activation execution layer, entries in an activation timetable configured to requisition application of the uniform activation determination uniformly to each of the multiple computing resources within the resource aggregate.

A2 The system of example A1, where the set of summary vectors characterize periods above and below an activation recommendation threshold for the multiple computing resources within the multiple timeslots.

A3 The system of either example A1 or A2, where the distance metrics are based on: grouping the summary vectors into groups; and determining distances between centers for the groups.

A4 The system of any examples of A1-A3, where the RA stack is further executable to, at the aggregation engine layer to aggregate the multiple computing resources by selecting the resource aggregates to achieve a base least-squares value.

A5 The system of any examples of A1-A4, where the RA stack is further executable to, at the aggregation engine layer, regroup the multiple computing resource into a specific number of resource aggregates after making uniform activation determinations for each of the selected number of resource aggregates, where: the specific number is different from the selected number; and the specific number is less than the total number of the multiple computing resources.

A6 The system of any examples of A1-A5, where the RA stack is further executable to, at the aggregation engine layer and for each of the resource aggregates, determine the uniform activation determination based on a first aggregate activation threshold.

A7 The system of any examples of A1-A6, where the RA stack is further executable to, at the aggregation engine layer and for each of the resource aggregates: determine to make a uniform activation determination that activates each computing resource in the resource aggregate when a number of activation recommendations for the computing resources in the resource aggregate exceeds the first aggregate activation threshold; and determine to make a uniform activation determination that deactivates each computing resource in the resource aggregate when the number of activation recommendations for the computing resources in the resource aggregate is below the first aggregate activation threshold.

A8 The system of any examples of A1-A7, where the RA stack is further executable to, at the aggregation engine layer and for each of the resource aggregates, re-determine the uniform activation determination based on a second aggregate activation threshold different that the first aggregate activation threshold to simulate uniform activation determinations for multiple different activation thresholds.

A9 The system of any examples of A1-A8, where the RA stack further includes a presentation layer configured to generate an RA control interface configured to accept operator selections uniform activation determination parameters.

A10 The system of any examples of A1-A9, where the RA control interface includes an RA-window presentation configured to display information on uniform activation determinations, uniform activation determination parameters, or both.

B1 In an example, a method includes: at network interface circuitry: receiving historical utilization data for multiple computing resources; and receiving activation schedule data for the multiple computing resources; and at aggregation circuitry in data communication with the network interface circuitry: parsing, at an input layer of a resource aggregation (RA) stack, the historical utilization data to generate interval-scaled data for a selected interval; storing, via a memory operation at a data staging layer of the RA stack, the interval-scaled data; accessing, at a treatment layer of the RA stack, the interval-scaled data using a memory resource provided by the data staging layer; generating, for each of the multiple computing resources, a set of activation determinations corresponding to multiple timeslots with a selected duration including the selected interval; storing, via a memory operation at the data staging layer, the set of activation determinations for each of the multiple computing resources; accessing, at a metrology layer of the RA stack, the set of activation determinations using a memory resource provided by the data staging layer; at the metrology layer, generating distance metrics by comparing the sets of activation determinations to determine spacings among individual ones of the multiple computing resources; based on the distance metrics, determine a set of summary vectors detailing the spacings among the individual ones of the multiple computing resources; passing, to an aggregation engine layer of the RA stack via memory operation at the data staging layer, the distance metrics and the summary vectors; based on the distance metrics and the summary vectors, aggregating the multiple computing resources in to a selected number of resource aggregates, the selected number being less than a total number of the multiple computing resources; and for each of the resource aggregates: determining, at a decision threshold layer of the RA stack, a uniform activation determination for a corresponding future timeslot of the selected duration; and generating, at an activation execution layer of the RA stack, entries in an activation timetable configured to requisition application of the uniform activation determination uniformly to each of the multiple computing resources within the resource aggregate.

B2 The method of example B1, where determining a uniform activation determination for each of the resource aggregates includes determining the uniform activation determination based on a first aggregate activation threshold.

B3 The method of either example B1 or B2, where determining a uniform activation determination for each of the resource aggregates includes: determining to make a uniform activation determination that activates each computing resource in the resource aggregate when a number of activation recommendations for the computing resources in the resource aggregate exceeds the first aggregate activation threshold; and determining to make a uniform activation determination that deactivates each computing resource in the resource aggregate when the number of activation recommendations for the computing resources in the resource aggregate is below the first aggregate activation threshold.

B4 The method of any of examples B1-B3, further including: for each of the resource aggregates, re-determining the uniform activation determination based on a second aggregate activation threshold different that the first aggregate activation threshold to simulate uniform activation determinations for multiple different activation thresholds.

B5 The method of any of examples B1-B4, further including generating, at a presentation layer of the RA stack, an RA control interface configured to accept operator selections uniform activation determination parameters.

B6 The method of any of examples B1-B5, where the RA control interface includes an RA-window presentation displaying information on uniform activation determinations, uniform activation determination parameters, or both.

C1 In an example, a product includes: machine-readable media other than a transitory signal; and instructions stored on the machine-readable media, the instructions configured to, when executed, cause a machine to: at network interface circuitry: receive historical utilization data for multiple computing resources; and receive activation schedule data for the multiple computing resources; and at aggregation circuitry in data communication with the network interface circuitry: parse, at an input layer of a resource aggregation (RA) stack, the historical utilization data to generate interval-scaled data for a selected interval; store, via a memory operation at a data staging layer of the RA stack, the interval-scaled data; access, at a treatment layer of the RA stack, the interval-scaled data using a memory resource provided by the data staging layer; generate, for each of the multiple computing resources, a set of activation determinations corresponding to multiple timeslots with a selected duration including the selected interval; store, via a memory operation at the data staging layer, the set of activation determinations for each of the multiple computing resources; access, at a metrology layer of the RA stack, the set of activation determinations using a memory resource provided by the data staging layer; at the metrology layer, generate distance metrics by comparing the sets of activation determinations to determine spacings among individual ones of the multiple computing resources; based on the distance metrics, determine a set of summary vectors detailing the spacings among the individual ones of the multiple computing resources; pass, to an aggregation engine layer of the RA stack via memory operation at the data staging layer, the distance metrics and the summary vectors; based on the distance metrics and the summary vectors, aggregate the multiple computing resources in to a selected number of resource aggregates, the selected number being less than a total number of the multiple computing resources; and for each of the resource aggregates: determine a uniform activation determination for a corresponding future timeslot of the selected duration; and generate, at an activation execution layer of the RA stack, entries in an activation timetable configured to requisition application of the uniform activation determination uniformly to each of the multiple computing resources within the resource aggregate.

The product of example C1, where the set of summary vectors characterize periods above and below an activation recommendation threshold for the multiple computing resources within the multiple timeslots.

The product of either example C1 or C2, where the distance metrics are based on grouping the summary vectors and determining distances between centers for the groups.

The product of any of examples C1-C3, where the instructions further configured to cause the machine to, at the aggregation engine layer, aggregate the multiple computing resources by selecting the resource aggregates to achieve a base least-squares value.

D1 A method implemented by operation of a system of any of examples A1-A10.

E1 A product including instructions stored on a machine readable medium, the instructions configured to cause a machine to implement the method of example D1.

Various implementations have been specifically described. However, many other implementations are also possible.

What is claimed is:

1. A system including:
network interface circuitry configured to:
    receive historical utilization data for multiple computing resources; and
    receive activation schedule data for the multiple computing resources; and
aggregation circuitry in data communication with the network interface circuitry, the aggregation circuitry configured to execute a resource aggregation (RA) stack,
the RA stack executable to:
    parse the historical utilization data to generate interval-scaled data for a selected interval;
    generate, for each of the multiple computing resources, a set of activation determinations corresponding to multiple timeslots, each of the multiple timeslots with a length equal to the selected interval;
    generate distance metrics by comparing the sets of activation determinations to determine spacings among individual ones of the multiple computing resources;
    based on the distance metrics, determine a set of summary vectors detailing the spacings among the individual ones of the multiple computing resources;
    based on the distance metrics and the summary vectors, aggregate the multiple computing resources in to a selected number of resource aggregates, the selected number being less than a total number of the multiple computing resources, such that each computing resource aggregated into a resource aggregate of the selected number of resource aggregates is controllable via aggregate-level management of the aggregated computing resources including uniform activation and deactivation along with each other computing resource included the same resource aggregate; and
    for each of the resource aggregates:
        determine a uniform activation determination for a corresponding future timeslot, the future timeslot having the length equal to selected interval; and
        generate entries in an activation timetable configured to requisition application of the uniform activation determination uniformly to each of the multiple computing resources within the resource aggregate, such that activations for individual ones of the multiple computing resources are reviewable together by reviewing the uniform activation determination.

2. The system of claim 1, where the set of summary vectors characterize periods above and below an activation recommendation threshold for the multiple computing resources within the multiple timeslots.

3. The system of claim 1, where the distance metrics are based on:
grouping the summary vectors into groups; and
determining distances between centers for the groups.

4. The system of claim 3, where the RA stack is further executable to aggregate the multiple computing resources by selecting the resource aggregates to achieve a base least-squares value.

5. The system of claim 1, where the RA stack is further executable to regroup the multiple computing resource into a specific number of resource aggregates after making uniform activation determinations for each of the selected number of resource aggregates, where:
the specific number is different from the selected number; and
the specific number is less than the total number of the multiple computing resources.

6. The system of claim 1, where the RA stack is further executable to, for each of the resource aggregates, determine the uniform activation determination based on a first aggregate activation threshold.

7. The system of claim 6, where the RA stack is further executable to, for each of the resource aggregates:
determine to make a uniform activation determination that activates each computing resource in the resource aggregate when a number of activation recommendations for the computing resources in the resource aggregate exceeds the first aggregate activation threshold; and
determine to make a uniform activation determination that deactivates each computing resource in the resource aggregate when the number of activation recommendations for the computing resources in the resource aggregate is below the first aggregate activation threshold.

8. The system of claim 6, where the RA stack is further executable to, for each of the resource aggregates, re-determine the uniform activation determination based on a second aggregate activation threshold different that the first aggregate activation threshold to simulate uniform activation determinations for multiple different activation thresholds.

9. The system of claim 1, where the RA stack is further executable to generate an RA control interface configured to accept operator selections uniform activation determination parameters.

10. The system of claim 9, where the RA control interface includes an RA-window presentation configured to display information on uniform activation determinations, uniform activation determination parameters, or both.

11. A method including:
at network interface circuitry:
receiving historical utilization data for multiple computing resources; and
receiving activation schedule data for the multiple computing resources; and
at a resource aggregation (RA) stack aggregation circuitry in data communication with the network interface circuitry:
parsing the historical utilization data to generate interval-scaled data for a selected interval;
generating, for each of the multiple computing resources, a set of activation determinations corresponding to multiple timeslots, each of the multiple timeslots with a length equal to the selected interval;
generating distance metrics by comparing the sets of activation determinations to determine spacings among individual ones of the multiple computing resources;
based on the distance metrics, determine a set of summary vectors detailing the spacings among the individual ones of the multiple computing resources;
based on the distance metrics and the summary vectors, aggregating the multiple computing resources in to a selected number of resource aggregates, the selected number being less than a total number of the multiple computing resources, such that each computing resource aggregated into a resource aggregate of the selected number of resource aggregates is controllable via aggregate-level management of the aggregated computing resources including uniform activation and deactivation along with each other computing resource included the same resource aggregate; and
for each of the resource aggregates:
determining a uniform activation determination for a corresponding future timeslot, the future timeslot having the length equal to selected interval; and
generating entries in an activation timetable configured to requisition application of the uniform activation determination uniformly to each of the multiple computing resources within the resource aggregate, such that activations for individual ones of the multiple computing resources are reviewable together by reviewing the uniform activation determination.

12. The method of claim 11, where determining a uniform activation determination for each of the resource aggregates includes determining the uniform activation determination based on a first aggregate activation threshold.

13. The method of claim 12, where determining a uniform activation determination for each of the resource aggregates includes:
determining to make a uniform activation determination that activates each computing resource in the resource aggregate when a number of activation recommendations for the computing resources in the resource aggregate exceeds the first aggregate activation threshold; and
determining to make a uniform activation determination that deactivates each computing resource in the resource aggregate when the number of activation recommendations for the computing resources in the resource aggregate is below the first aggregate activation threshold.

14. The method of claim 12, further including:
for each of the resource aggregates, re-determining the uniform activation determination based on a second aggregate activation threshold different that the first aggregate activation threshold to simulate uniform activation determinations for multiple different activation thresholds.

15. The method of claim 11, further including generating an RA control interface configured to accept operator selections uniform activation determination parameters.

16. The method of claim 15, where the RA control interface includes an RA-window presentation displaying information on uniform activation determinations, uniform activation determination parameters, or both.

17. A product including: machine-readable media other than a transitory signal; and instructions stored on the machine-readable media, the instructions configured to, when executed, cause a machine to:
   at network interface circuitry:
      receive historical utilization data for multiple computing resources; and
      receive activation schedule data for the multiple computing resources; and
   at a resource aggregation (RA) stack aggregation circuitry in data communication with the network interface circuitry:
      parse the historical utilization data to generate interval-scaled data for a selected interval;
      generate, for each of the multiple computing resources, a set of activation determinations corresponding to multiple timeslots, each of the multiple timeslots with a length equal to the selected interval;
      generate distance metrics by comparing the sets of activation determinations to determine spacings among individual ones of the multiple computing resources;
      based on the distance metrics, determine a set of summary vectors detailing the spacings among the individual ones of the multiple computing resources;
      based on the distance metrics and the summary vectors, aggregate the multiple computing resources in to a selected number of resource aggregates, the selected number being less than a total number of the multiple computing resources, such that each computing resource aggregated into a resource aggregate of the selected number of resource aggregates is controllable via aggregate-level management of the aggregated computing resources including uniform activation and deactivation along with each other computing resource included the same resource aggregate; and
      for each of the resource aggregates:
         determine a uniform activation determination for a corresponding future timeslot, the future timeslot having the length equal to selected interval; and
         generate entries in an activation timetable configured to requisition application of the uniform activation determination uniformly to each of the multiple computing resources within the resource aggregate, such that activations for individual ones of the multiple computing resources are reviewable together by reviewing the uniform activation determination.

18. The product of claim 17, where the set of summary vectors characterize periods above and below an activation recommendation threshold for the multiple computing resources within the multiple timeslots.

19. The product of claim 17, where the distance metrics are based on grouping the summary vectors and determining distances between centers for the groups.

20. The product of claim 19, where the instructions further configured to cause the machine to aggregate the multiple computing resources by selecting the resource aggregates to achieve a base least-squares value.

* * * * *